United States Patent [19]
Jaworski

[11] Patent Number: 5,554,829
[45] Date of Patent: Sep. 10, 1996

[54] LAND SEISMIC ACOUSTIC SOURCE

[76] Inventor: Bill L. Jaworski, P.O. Box 290, Burley, Wash. 98322

[21] Appl. No.: 388,563

[22] Filed: Feb. 14, 1995

[51] Int. Cl.$^6$ .................................................. G01V 1/143
[52] U.S. Cl. ....................... 181/114; 181/113; 181/121; 181/401
[58] Field of Search ........................ 181/113, 114, 181/401, 121; 367/189, 75

[56] References Cited

U.S. PATENT DOCUMENTS

| | | | |
|---|---|---|---|
| 3,193,046 | 7/1965 | Williams | 181/0.5 |
| 3,313,370 | 4/1967 | Cole | 181/0.5 |
| 3,576,522 | 4/1971 | Doty et al. | 340/15.5 |
| 3,999,626 | 12/1976 | Adams | 181/114 |
| 4,011,924 | 3/1977 | Barbier | 181/121 |
| 4,301,888 | 11/1981 | Gibson et al. | 181/114 |

FOREIGN PATENT DOCUMENTS

| | | | |
|---|---|---|---|
| 2457500 | 12/1980 | France | 181/113 |
| 1608604 | 7/1988 | U.S.S.R. | 181/114 |

OTHER PUBLICATIONS

Edwin B. Neitzel, "Seismic Reflection Records Obtained by Dropping a Weight," *Geophysics*, Vol. XXIII, No. 1, Jan. 1958, pp. 58–80, 22 FIGS.

John M. Crawford et al., "Continuous Signal Seismograph," *Geophysics*, vol. XXV, No. 1, Feb. 1960, pp. 95–105, 9 FIGS.

Robert L. Geyer, "The Vibroseis® System of Seismic Mapping," Reprinted from the *Journal of the Canadian Society of Exploration Geophysicists*, 6, 39–58, pp. 4–22.

*Primary Examiner*—Ian J. Lobo
*Attorney, Agent, or Firm*—Christensen O'Connor Johnson & Kindness PLLC

[57] ABSTRACT

An apparatus and method for generating a seismic signal in the earth consisting of positioning a force-modulating means on the surface of the earth and then positioning a vehicle such that at least some of the weight of the vehicle is supported by the force-modulating means. At least one of the vehicle drive wheels is then rotated to cause the force applied to the earth by the force-modulating means to change thereby generating a seismic signal in the earth.

20 Claims, 3 Drawing Sheets

1

LAND SEISMIC ACOUSTIC SOURCE

FIELD OF THE INVENTION

The present invention relates to a method for mechanically generating acoustic waves in the earth. More particularly the invention relates to a method for generating a sequence of acoustic waves for land seismic surveying operations.

BACKGROUND OF THE INVENTION AND PRIOR ART

The propagation of acoustic waves in the earth is useful for land surveying operations. The waves are generated and the resultant refracted and reflected wave patterns are recorded with pickups at predetermined locations to study subsurface characteristics.

Prior art methods for mechanically generating acoustic waves in the earth teach that the generation of acoustic signals in the earth require the acceleration of the earth directly adjacent to the generating means. The methods all require a source of energy and, in general, rely on the force of gravity acting on a mass.

A prior art method uses a generating means consisting of a moving mass striking or impacting the earth. The simplest embodiment of this impacting method uses a manually manipulated mass, usually a hammer, to impact a plate placed on the surface of the earth. Although this manually actuated embodiment is widely used, the energy of the generated acoustic wave is severely limited by the strength of the individual manipulating the mass. Higher energy levels have been accomplished by utilizing a large impacting mass that is mechanically raised above the earth and released. The large mass is accelerated downward toward the earth by the force of gravity for impact. A simple embodiment of this mechanically assisted weight drop method is described by Neitzel in *Geophysics*, vol. XXIII, No. 1, p. 58, 1958. Another mechanically assisted weight drop method uses spring force in addition to the force of gravity to accelerate the mass toward the, earth as taught by Williams, U.S. Pat. No. 3,193,046. All of the mechanically assisted weight drop methods require a large, specialized impacting mass, as well as the associated support frame and lifting device. Additionally, a reaction mass is required if spring-assist mechanisms are used. Therefore, the embodiments of the impacting mass method either generates very low energy seismic signals or requires specialized, heavy apparatus to implement the method.

The effectiveness of the impacting mass technique can be improved by repeating the impact a number of times and summing the resulting data. In the simplest form of this summing technique the record obtained from a single impact is added to data obtained from previous impacts. This simplest summing method is very time consuming. An improved method for using a rapidly impacting device is taught by Barbier in U.S. Pat. No. 4,011,924, incorporated herein by reference. In this rapidly impacting method a pseudo-random sequence of impacts is generated by a mechanical device and the sequence is recorded and subsequently used to process the resulting seismic data using a modified correlation operation. The usefulness of the rapidly impacting apparatus described by Barbier is limited by the expense of a specialized impacting device and the potential for the sequence of impacts generated to be nonrandom and therefore resulting in data which is ringy (i.e., nonrandom resulting output oscillations) and of low resolution.

Another prior an method uses a mass to apply a continuous force to the earth. This force is mechanically varied with respect to time in a cyclical manner by acceleration of the mass. Typically the force applied to the earth is modulated in such a manner as to generate a swept-frequency sinusoidal seismic signal. Devices which use this method are generally referred to as vibrators and are used in conjunction with the Vibroseis method described by Geyer in the *Journal of the Canadian Society of Exploration Geophysicists*, vol. 6, pp. 39–58, incorporated herein by reference. An early embodiment of this method, which uses spinning eccentric weights to change the amplitude of the force applied to the earth, is taught by Doty et at., U.S. Pat. No. 2,668,128 and also described in Crawford, Doty and Lee; *Geophysics vol. XXV, No. 1*, p. 95, 1960. Subsequently, other embodiments of this method were developed using hydraulic-actuated vibrators to allow greater control of the generated signal. Yet another method of varying the force applied to the ground uses an electromagnetic technique to vary the force such as the apparatus taught by Cole in U.S. Pat. No. 3,313,370. All of the above-described vibrators require a dedicated actuating mechanism, large specialized reaction mass and typically specialized power supplies. Therefore, this modulated force method is expensive to implement and requires heavy, specialized equipment.

A number of seismic energy generating methods have been adapted for use with vehicles. They use the vehicle as a means of moving the energy generating means and often as a reaction mass against which the actuation mechanism such as springs or hydraulic actuators can act. Many weight drop type of sources have been mounted on vehicles. The vibrators described above are typically mounted on specialized vehicles. All of these adaptations require specialized modification of a standard vehicle or in some cases the construction of a special vehicle which adds considerable expense and can limit the utility of the vehicle for other applications.

Gibson in U.S. Pat. No. 4,301,888 teaches the use of the weight of a vehicle to supply a coupling force for a shear wave seismic energy generating apparatus. Although this approach eliminates the need for a specialized, dedicated reaction mass, the signal generating apparatus requires a specialized hydraulic cocking mechanism, is limited to shear wave generation, and requires a specialized power supply to restore the mechanism. Therefore, this method is expensive to implement and limited to shear wave seismic surveys.

OBJECT OF THE INVENTION

Accordingly, it is an object of this present invention to provide a method for generating a seismic signal that utilizes an inexpensive, simple, reliable, light-weight specialized apparatus together with an unmodified standard vehicle, a method which uses the vehicle as a reaction mass and is also driven by the vehicle drive wheel and therefore uses the engine of the vehicle as a source of energy.

It is a further object to provide a method which may be easily and inexpensively adapted to generate a seismic signal tailored to the application, rich in the desired frequencies and either of a swept-frequency sinusoidal wave form or a variable rate series of impulsive events.

It is a further object to provide a method which may be easily and inexpensively adapted to generate a seismic signal with its energy concentrated in either compressional or shear modes.

SUMMARY OF THE INVENTION

The present invention provides a method for generating seismic signals in the earth in which the seismic signal is generated by modulating the force applied to the earth by the mass of a vehicle using energy provided by the vehicle's engine and supplied by the vehicle's drive wheel. The method utilizes a drive roller mounted in a base assembly. The base assembly is placed on the surface of the earth. The drive wheel is positioned against the drive roller so that some of the weight of the vehicle is supported by the base assembly. The drive wheel is then caused to rotate while the vehicle is maintained in substantially the same relative: average position relative to the base assembly. The rotation of the drive wheel causes the drive roller to rotate. The rotation of the drive roller then causes the force applied to the earth due to the vehicle's mass to change thereby generating a seismic signal.

Generally, the signal generated by the method of the present invention is of a relatively long duration and composed of a cyclic modulation of the force applied to the earth. In the preferred embodiments, the rate of this cyclic modulation is determined by the rotational speed of the drive wheel and therefore is a function of the engine speed. Thus, in preferred embodiments of the present invention, the rate of the cyclic modulation is controlled by regulating the fuel supplied to the engine and also the use of the vehicle's braking system. In practice, the rotational speed of the drive wheel is constantly varied during operation to generate a signal useful for seismic surveys.

Two general forms of modulation of the force applied to the earth are possible using the method of the present invention, a gradual and continuous change which results in the generation of a sinusoidal wave form, and a repeated sudden, abrupt change which results in an impulsive change in the force applied and therefore a wave form composed of a plurality of impulsive, broad band events.

The method is also adaptable to generating primarily compressional or shear seismic signals by incorporating different force generating means. The modulation of the force applied to the earth in a vertical direction results in the generation of compressional seismic waves while modulation of the force in a horizontal plane results in the generation of shear seismic waves.

The seismic signals generated by the method and apparatus of the present invention are intended for use in the Vibroseis method when a sinusoidal wave form is generated or the Sosie method when a series of impulsive events make up the generated seismic signal. Both the Vibroseis and the Sosie methods require a record of the force modulation generated by the signal-generating apparatus for later use in a correlation type process. The method of the present invention uses either the direct measurement of the output of the force-modulating means or the measurement of the mechanical operation of the force-modulating means. The direct measurement of the output can be accomplished using an accelerometer or similar device mounted on the base assembly or by positioning a similar sensor near or ideally buried directly under the base assembly. The measurement of the mechanical operation of the force-modulating means can be accomplished by positioning a sensor such as a proximity sensor to monitor the rotation of the drive roller.

A preferred apparatus for carrying out the method of the invention includes a base and a drive roller. The base has a bottom for placement on the ground. The drive roller is rotatably secured to the base and has an axis of rotation and a surface arranged and configured for engagement with the drive wheel of the vehicle. At least a portion of the surface of the drive roller is farther from the axis of rotation than other portions of the surface. The axis of rotation of the drive roller is generally parallel to the bottom of the base. In one embodiment the cross-sectional shape of the drive roller is elliptical. In another embodiment the surface includes a substantial discontinuity extending longitudinally along the drive roller. Preferably, a sensor is provided adjacent the drive roller for monitoring the rotation of the drive roller.

An idler roller is also preferably rotatably secured to the base. The idler roller is spaced from the drive roller such that the drive wheel of the vehicle can be positioned between them. The idler roller includes an axis of rotation substantially parallel to the axis of rotation of the drive roller and is positioned higher than the axis drive roller relative to the base.

Another preferred apparatus for carrying out the invention and providing shear waves in the earth includes a base, a roller base assembly, a drive roller, and a coupling. The base plate has a bottom for placement on the ground. The roller base assembly is slidably coupled to the base. The drive roller is rotatably mounted to the roller base assembly and is arranged and configured to be engaged by the vehicle drive wheel. The coupling is eccentrically secured to the drive roller and connected to the base plate, such that rotation of the drive roller causes movement of the base relative to the roller base assembly. Preferably, the coupling includes a connecting rod eccentrically secured to the drive roller and pivotally secured to the base plate. An accelerometer is also preferably mounted to the base plate.

In the preferred embodiment, the apparatus includes an idler roller rotatably secured to the roller base assembly spaced from the drive roller. The idler roller is arranged and configured to contact the vehicle drive wheel. The drive roller and the idler roller each have axes of rotation generally parallel to each other and to the base plate. Also in this embodiment, the rollers have generally circular cross-sectional shapes.

BRIEF DESCRIPTION OF THE DRAWINGS

The foregoing aspects and many of the attendant advantages of this invention will become more readily appreciated as the same: become better understood by reference to the following detailed description, when taken in conjunction with the accompanying drawings, wherein.

DETAILED DESCRIPTION OF THE PREFERRED EMBODIMENT

Figure 1:
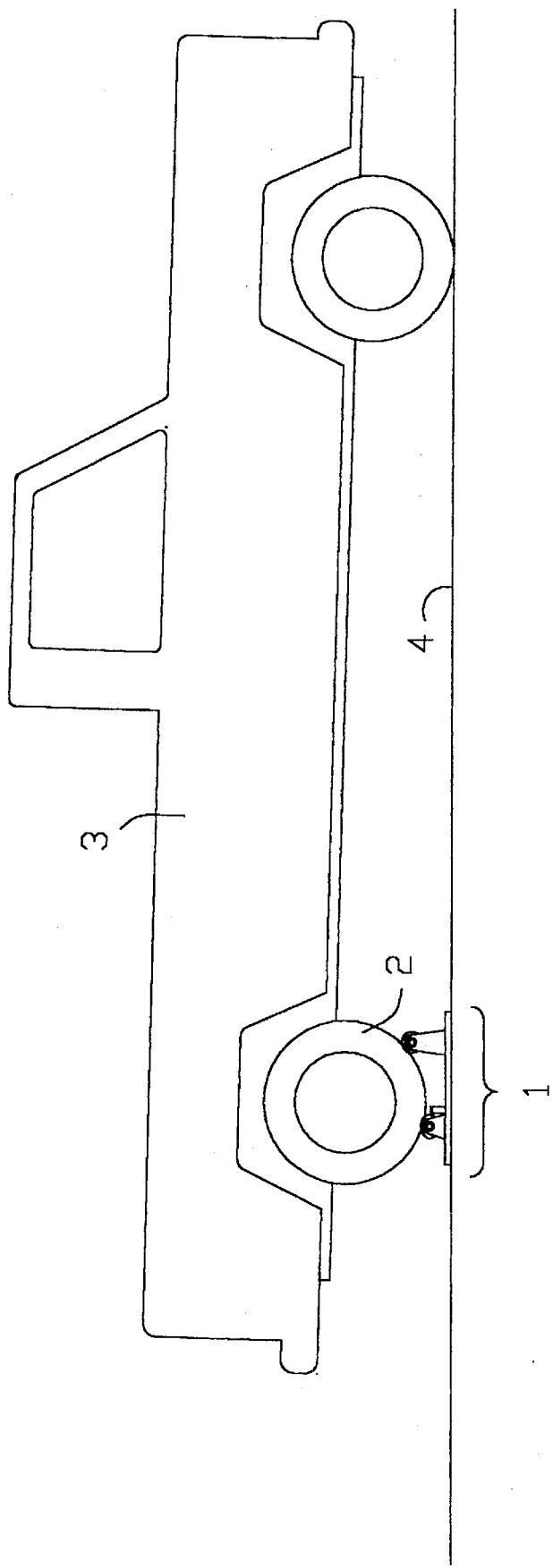
FIG. 1 shows the force modulating means for generating compressional seismic signals positioned under the drive wheel of a vehicle.

A preferred embodiment of the method for generating compressional seismic signals is illustrated in FIG. 1. In particular, FIG. 1 shows the force-modulating means 1 positioned on the surface of the earth 4. A drive wheel 2 of vehicle 3 is shown resting on the force-modulating means 1.

Figure 2:
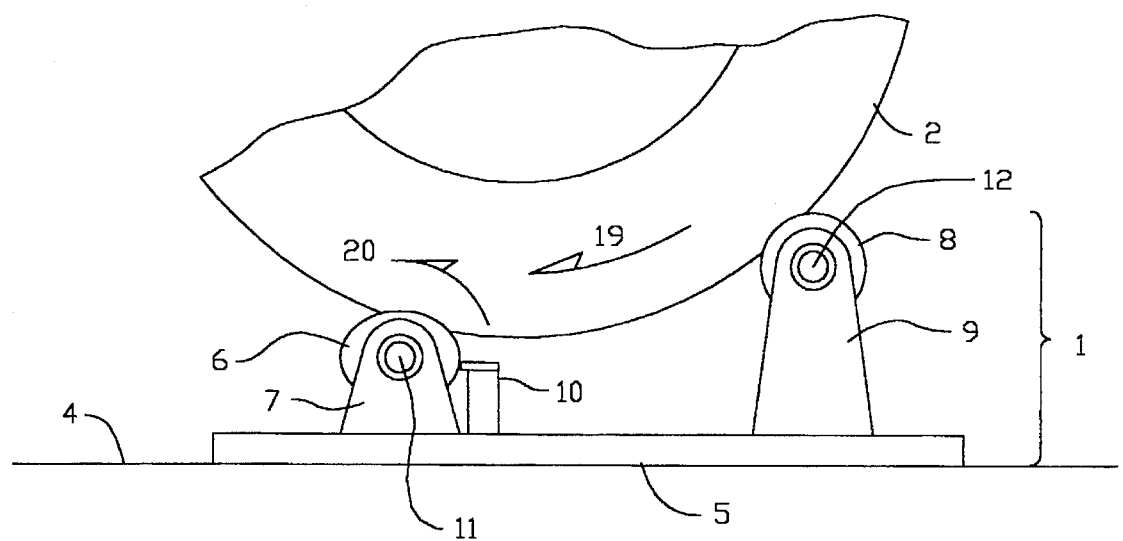
FIG. 2 shows a detailed side view of the force modulating means for generating a compressional signal with a sinusoidal wave form positioned under the drive wheel of a vehicle.
Figure 3:
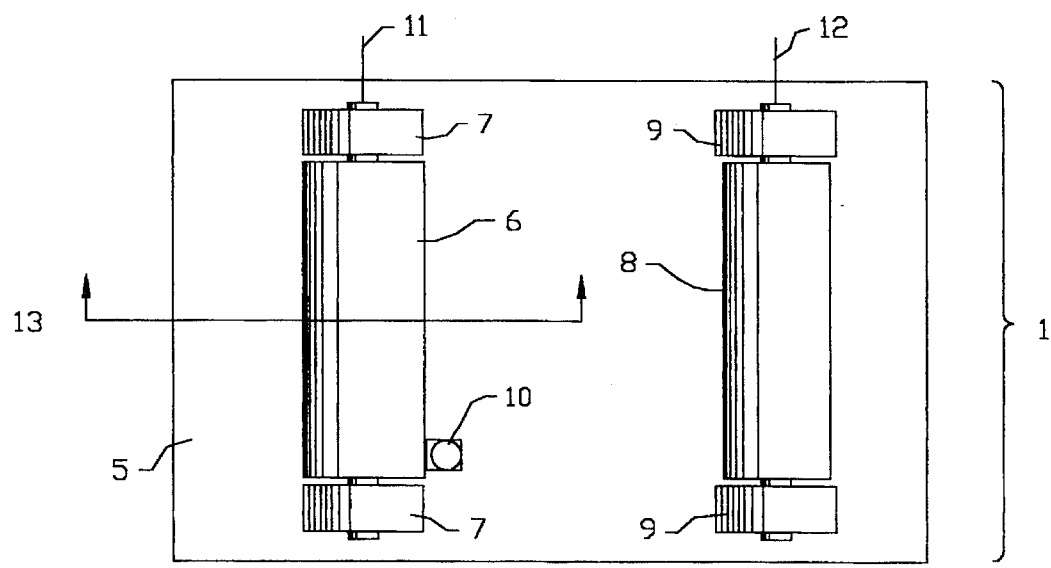
FIG. 3 shows a detailed top view of the force modulating means of FIG. 2.
Figure 4:
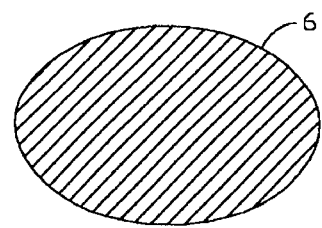
FIG. 4 shows a cross section of the drive roller for generating a compressional signal with a sinusoidal wave form.

FIGS. 2 and 3 illustrate the force-modulating means 1 of FIG. 1 in greater detail. FIG. 2 shows the base plate assembly 5 positioned at the desired position on the surface of the earth 4 and the vehicle drive wheel 2 resting on the drive roller 6 and the idler roller 8. The drive roller 6 is positioned near the bottom of the drive wheel 2. The drive roller 6 is mounted in the drive roller supports 7 for rotation about axis 11. The idler roller 8 is mounted in idler roller supports 9 for rotation about axis 12. The roller supports 7 and 9 are rigidly mounted to the base plate assembly 5. FIG. 4 shows a cross section through drive roller 6 in a plane represented by line 13 of FIG. 3. Notice that the cross section is elliptical in shape and is adapted to generate a sinusoidal wave form with two cycles per revolution of roller 6. Proximity sensor 10 is located adjacent to the surface of the drive roller 6 and generates a signal whose amplitude is proportional to the distance from the sensor 10 to the surface of the roller 6.

In operation the preferred embodiment of FIGS. 1, 2, and 3, the force modulating means 1 is positioned at the desired position on the surface of the earth 4 for the seismic survey. The vehicle 3 is then driven into the position shown in FIG. 1 with the drive wheel 2 positioned on the rollers 6 and 8. The idler roller 8 serves to hold the drive wheel 2 in position over the drive roller 6. The operator causes the drive wheel 2 of the vehicle 3 to begin to rotate at the desired time. The drive roller 6 is caused to rotate by the rotation of the drive wheel 2. The rotation of the drive roller 6 causes the force applied to the earth 4 by the base plate assembly 5 to vary due to the eccentric shape of the drive roller 6. The speed of the rotation of the drive wheel is gradually and continuously changed during the duration of the desired signal. The acceleration of the rotational speed is adjusted to generate a signal with the desired energy distribution in the desired frequencies. The signal from sensor 10 is recorded for use in processing the data acquired during the survey. The signal generated by drive rollers with continuous and gradual change in radius, such as the elliptical roller of FIG. 4, generates a signal with a sinusoidal wave form and are used in conjunction with the Vibroseis method.

Figure 5:
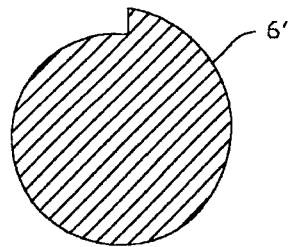
FIG. 5 shows a cross section of the drive roller for generating a compressional seismic signal made up of a sequence of impulsive events.

FIG. 5 illustrates the cross section of a drive roller 6' for use in generating a signal in which the wave form is dominated by a series of impulsive, broad band events. The radius of the outer surface has an abrupt change which generates the impulsive event on the generated wave form. Again, the output of sensor 10 monitors the rotation of the drive roller 6' and the signal is recorded. The signal generated by drive rollers of this form is used in connection with the Sosie method.

Figure 6:
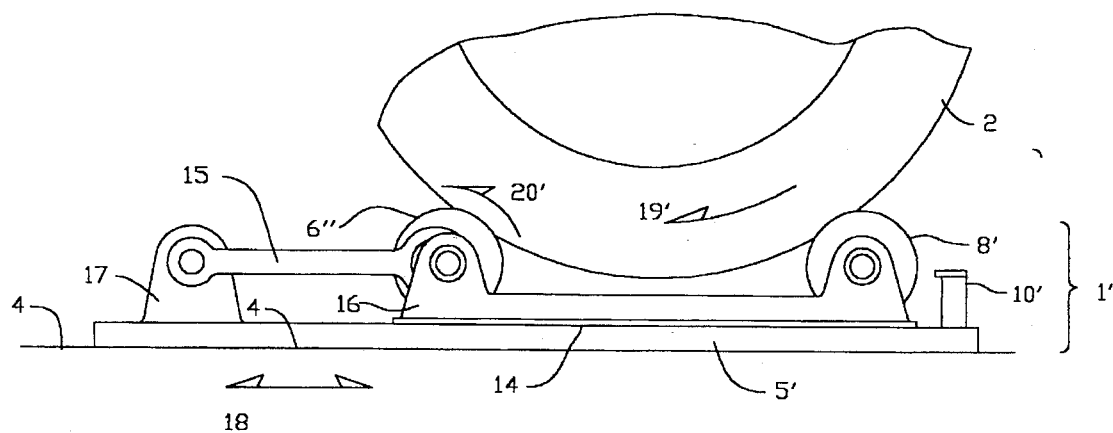
FIG. 6 shows the force modulating means for generating shear waves of a sinusoidal wave form.

FIG. 6 illustrates a second preferred embodiment and method of the present invention. The apparatus of FIG. 6 is adapted for the generation of a seismic signal rich in shear energy. The base plate assembly 5' is positioned on the surface of the earth 4 at the desired location. The pivot arm 17 is rigidly mounted to base plate assembly 5'. Similar to the first embodiment, a drive wheel 2 of the vehicle is positioned on drive roller 6" and idler roller 8'. Both the drive roller 6" and the idler roller 8' are mounted for rotation about substantially horizontal axes in roller base assembly 16. A linear bearing 14 supports the roller base assembly 16 and allows the roller base assembly 16 to move in a horizontal direction relative to the pivot arm 17 as indicated by arrow 18. Connecting rod 15 connects the pivot arm 17 and the drive roller 6". The connecting rod 15 is mounted to the pivot arm 17 to allow rotation about a horizontal axis. The connecting rod 15 is also mounted to the drive roller 6" to allow rotation about an eccentrically projecting cylindrical bearing surface on the end of the drive roller 6". The cylindrical bearing surface is offset from the axis of rotation of the drive roller 6". An accelerometer 10 is rigidly mounted to base plate assembly 5' to monitor the horizontal motion of the base plate assembly.

In operation of the embodiment of FIG. 6 the drive wheel 2 is caused to rotate, as indicated by arrow 19', thereby causing drive roller 6" to rotate, as indicated by arrow 20'. The connecting rod 15 causes the distance between pivot arm 17 and the roller base assembly 16 to change. Thus, the roller base assembly 16 moves in a cyclic manner in a horizontal plane relative to the base plate assembly 5' sliding on bearing 14. This cyclic motion applies a cyclic shearing force to the earth 4 under the base plate assembly 5' thereby generating a seismic signal in the earth 4 rich in shear energy. The embodiment of FIG. 6 generates a signal with a sinusoidal wave form for use in the Vibroseis method.

While several preferred embodiments of the invention have been disclosed in detail, it is to be understood that changes and modifications may be made to them without departing from the spirit and scope of the invention.

The embodiments of the invention in which an exclusive property or privilege is claimed are defined as follows:

1. An apparatus for generating a seismic signal in the earth in cooperation with a vehicle having a drive wheel, the apparatus comprising:

(a) a base having a bottom for placement on the ground; and (b) a drive roller rotatably secured to said base, said drive roller having an axis of rotation and a surface arranged and configured for engagement with the drive wheel of the vehicle, at least a portion of said surface of said drive roller being farther from the axis of rotation than other portions of said surface.

2. The apparatus of claim 1, further comprising an idler roller rotatably secured to said base and spaced from said drive roller.

3. The apparatus of claim 2, wherein the axis of rotation of said drive roller is generally parallel to the bottom of said base.

4. The apparatus of claim 3, wherein said idler roller has an axis of rotation substantially parallel to the axis of rotation of said drive roller and wherein the axis of rotation of said idler roller is positioned higher than the axis of rotation of said drive roller relative to said base.

5. The apparatus of claim 1, further including a sensor adjacent said drive roller for monitoring the rotation of said drive roller.

6. The apparatus of claim 1, wherein said drive roller has a generally elliptical cross-sectional shape.

7. The apparatus of claim 1, wherein said drive roller includes a substantial surface discontinuity extending longitudinally along said drive roller.

8. An apparatus for generating a seismic signal in the earth in cooperation with a vehicle having a drive wheel, the apparatus comprising:

(a) a base plate having a bottom for placement on the ground;

(b) a roller base assembly slidably coupled to said base plate;

(c) a drive roller rotatably mounted to said roller base assembly, said drive roller being arranged and configured to be engaged by the vehicle drive wheel; and (d) a coupling eccentrically secured to said drive roller and connected to said base plate such that rotation of said drive roller causes movement of said base relative to said roller base assembly.

9. The apparatus of claim 8, wherein said coupling comprises a connecting rod eccentrically secured to said drive roller and pivotally secured to said base plate.

10. The apparatus of claim 8, further including an accelerometer mounted to said base plate.

11. The apparatus of claim 8, further including an idler roller rotatably secured to said roller base assembly spaced from said drive roller, said idler roller being arranged and configured to contact the vehicle, drive wheel.

12. The apparatus of claim 11, wherein said drive roller and said idler roller each have axes of rotation generally parallel to each other and to said base plate.

13. The apparatus of claim 12, wherein said drive roller and said idler roller have generally circular cross-sectional shapes.

14. An apparatus for generating a seismic signal in the ground in cooperation with a vehicle having a drive wheel, the apparatus comprising:

(a) a base for placement on the ground;

(b) a driver roller rotatably coupled to said base, said drive roller having an axis of rotation and an exposed, unobstructed, wide top surface arranged and configured for engagement with the drive wheel of the vehicle;

(c) a means connected to said drive roller for causing movement of said base with respect to the ground, and with respect to the drive wheel, to create a seismic signal in the ground upon rotation of the vehicle drive wheel.

15. The apparatus of claim 14, wherein said means for causing movement creates generally horizontal movement of said base with respect to said drive roller to cause a shearing force to be applied to the ground under said base.

16. The apparatus of claim 14, wherein said means for causing movement creates generally vertical movement of said base with respect to the ground, the base being cyclically forced downwardly.

17. A method of generating a seismic signal in the earth with a vehicle having a drive wheel, comprising:

(a) providing a force modulator said modulator having a base and a drive roller rotatably attached to the base;

(b) positioning the modulator on the surface of the earth;

(c) positioning the drive wheel of the vehicle on the modulator so that at least a portion of the weight of the vehicle is supported by the drive roller;

(d) causing the drive wheel of the vehicle to rotate, such that the drive roller is rotated with rotation of the drive roller causing the force modulator to impart a force to the earth, the force creating a seismic signal.

18. The method of claim 17, wherein the drive roller is slidably mounted to the base, and wherein said modulator further includes a link eccentrically and rotatably attached to the drive roller and pivotally attached to the base, the modulator causing the base to shift generally horizontally with respect to the vehicle and the drive roller.

19. The method of claim 17, wherein the drive roller includes an axis of rotation and a surface arranged and configured for engagement with the drive wheel of the vehicle, at least a portion of the surface of the drive roller being farther from the axis of rotation than other portions of the surface.

20. The method of claim 17, further comprising sensing and recording the frequency of force imparted to the earth by the force modulator.

* * * * *

UNITED STATES PATENT AND TRADEMARK OFFICE
CERTIFICATE OF CORRECTION

PATENT NO. : 5,554,829
DATED : September 10, 1996
INVENTOR(S) : Bill L. Jaworski It is certified that error appears in the above-indentified patent and that said Letters Patent is hereby corrected as shown below:

| COLUMN | LINE | |
|---|---|---|
| 7 (Claim 11, | 11 line 4) | After "vehicle" delete --,-- |
| [56] Pg. 1, col. 1 | Refs. Cited (US Pat Docs) | Insert the following reference: --4,603,409  7/1986  Jaworski-- |
| [56] Pg. 1, col. 2 | Refs. Cited (Other Publs.) | Insert the following reference: --R.D. Miller et al., "Field Comparison of Shallow Seismic Sources," *Geophysics*, Vol. 51, No. 11, Nov. 1986, pp. 2067–2092-- |

Signed and Sealed this

Fourth Day of February, 1997

Attest:

BRUCE LEHMAN

*Attesting Officer*        *Commissioner of Patents and Trademarks*